(12) United States Patent
Jesberger et al.

(10) Patent No.: US 7,364,800 B2
(45) Date of Patent: Apr. 29, 2008

(54) BIAXIALLY ORIENTED POLYESTER FILM WITH ADHESION-PROMOTING COATING

(75) Inventors: Martin Jesberger, Mainz (DE); Holger Kliesch, Ginsheim (DE); Gottfried Hilkert, Saulheim (DE); Stefan Bartsch, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 11/582,680

(22) Filed: Oct. 18, 2006

(65) Prior Publication Data
US 2007/0092695 A1 Apr. 26, 2007

(30) Foreign Application Priority Data
Oct. 22, 2005 (DE) .......... 10 2005 050 758
Feb. 22, 2006 (DE) .......... 10 2006 008 159

(51) Int. Cl.
*B32B 27/08* (2006.01)
*B32B 27/18* (2006.01)
*B32B 27/30* (2006.01)
*B32B 27/36* (2006.01)
*B32B 37/00* (2006.01)

(52) U.S. Cl. .......... 428/483; 428/32.1; 428/32.18; 428/32.19; 428/32.2; 428/141; 428/480; 428/522; 428/910

(58) Field of Classification Search .......... None
See application file for complete search history.

(56) References Cited

U.S. PATENT DOCUMENTS

| | | | | |
|---|---|---|---|---|
| 5,192,620 A | * | 3/1993 | Chu et al. .......... | 428/461 |
| 5,430,111 A | * | 7/1995 | Recchia et al. .......... | 525/369 |
| 5,776,604 A | * | 7/1998 | Lu et al. .......... | 428/343 |
| 5,958,552 A | | 9/1999 | Fukuda et al. .......... | 428/141 |
| 6,114,021 A | | 9/2000 | Pankratz et al. .......... | 428/214 |
| 6,184,281 B1 | * | 2/2001 | Craun et al. .......... | 524/413 |
| 2003/0087991 A1 | | 5/2003 | Engel et al. .......... | 523/201 |
| 2004/0076844 A1 | | 4/2004 | Tojo et al. .......... | 428/480 |
| 2004/0091645 A1 | * | 5/2004 | Heederik et al. .......... | 428/32.1 |
| 2004/0126507 A1 | * | 7/2004 | O'Brien .......... | 428/32.1 |
| 2005/0245651 A1 | * | 11/2005 | Cooper .......... | 524/270 |

FOREIGN PATENT DOCUMENTS

| | | |
|---|---|---|
| DE | 100 35 328 A1 | 1/2002 |
| EP | 0 782 932 A1 | 7/1997 |
| EP | 0 959 097 A2 | 11/1999 |
| EP | 1 114 733 A1 | 7/2001 |
| GB | 1 201 639 * | 8/1970 |
| WO | WO 2005/108518 A2 | 11/2005 |

OTHER PUBLICATIONS

Schimtz, Peter et al., "Films." Ullmann's Encyclopedia of Industrial Chemistry, 5th Ed., vol. A11 (1988), pp. 85-95, 105-06, 108-110.*

* cited by examiner

*Primary Examiner*—Vivian Chen
(74) *Attorney, Agent, or Firm*—ProPat, L.L.C.

(57) ABSTRACT

The invention relates to an in-line coated, biaxially oriented polyester film in which at least one surface has a coating formed from the dried residue of an aqueous coating composition, where the aqueous coating composition includes from 1 to 20% by weight (based on the weight of the coating composition) of EAA (ethylene-acrylic acid copolymer) particles whose median particle size ($d_{50}$ value) is from 1 to 200 μm.

15 Claims, No Drawings

BIAXIALLY ORIENTED POLYESTER FILM WITH ADHESION-PROMOTING COATING

CROSS-REFERENCE TO RELATED APPLICATIONS

This application claims priority to its parent applications, German Patent Application 10 2006 008 159.5, filed Feb. 22, 2006 and German Patent Application 10 2005 050 758.1, filed Oct. 22, 2005, which are hereby incorporated by reference herein, in their entirety.

FIELD OF THE INVENTION

The invention relates to a biaxially oriented polyester film. The inventive film has at least one surface which has good adhesion to printing inks, preferably to printing inks for digital printing, more specifically the HP (Hewlett Packard) Indigo print system. To this end, this surface is in-line coated with a water-based dispersion to promote adhesion. The invention further relates to a process for the production and coating of the film and to the use of the film.

Biaxially oriented polyester films are known.

Aqueous EAA copolymers (EAA=ethylene-acrylic acid) coating dispersions are likewise known.

EP-A-0 782 932 describes a coating for lithographic printing of plastics films. This acrylate-containing coating is comprised of a blend comprised of EAA copolymer and of at least one filler, such as calcium carbonate, talc, clay, titanium dioxide, or a mixture of these fillers. Surfactants and, optionally, UV stabilizers can moreover be present therein.

U.S. Pat. No. 5,430,111 describes methods for production of aqueous EAA dispersions. The carboxylate groups of the EAA here have been satisfied completely by ammonium, sodium, or potassium ions. These coating dispersions are particularly suitable as adhesion promoters for printing inks.

The specifications mentioned describe dispersions which are suitable in principle for off-line coating on polyester. However, there is no indication of suitability for in-line coating in which the coating is oriented transversely together with the film. The dispersions described are generally too viscous, and their solids content is too high, and there is no mention of the optimum particle size distribution. Nor is there any mention of the ideal surface tension needed for adhesion of ElectroInk printing inks for printers in the HP Indigo range.

SUMMARY OF ADVANTAGEOUS EMBODIMENTS OF THE INVENTION

It was an object of the invention to provide in-line coated, biaxial polyester films which have particular suitability for digital printing. The requirements placed upon the coating are the following:
 low solids concentration,
 good coatability and orientability,
 improved optical properties (reduction in streaking and in defects in the coating),
 very good adhesion of the printing inks to the coating,
 sharp print image by digital printing (HP Indigo),
 solvent-free coating,
 better cost-effectiveness,
 good storage capability of the coated film.

It was therefore an object of the present invention to provide a biaxially oriented polyester film with an adhesion promoter featuring, when compared with the in-line and off-line coated polyester films established in the market, improved optical properties and in particular good adhesion to printing inks, preferably to printing inks for digital printing (HP Indigo). Aqueous in-line coating is therefore desired for better cost-effectiveness and environmental compatibility.

This object is achieved via the in-line coating of a polyester film with a dilute aqueous EAA copolymer dispersion. Within a certain concentration range and certain particle size of the EAA particles, this can be applied in-line to the polyester film with a surprising degree of freedom from streaking, and can be stretched without difficulty to give a homogeneous thin layer. Digital printing inks (e.g. the Electroink 4.0 range from HP) for printers in the HP Indigo range adhere very well to the resultant coated film and give a high-quality print image.

Other advantages with respect to the in-line process are:
 better cost-effectiveness;
 streak-free application of the coating solution;
 when transparent films are needed for semitransparent prints, the lower coating thicknesses of the in-line coating and the low solids content lead to lower intrinsic haze of the coating in comparison with off-line coated films;
 better print image.

The result is a brighter appearance for the digital print.

DETAILED DESCRIPTION OF ADVANTAGEOUS EMBODIMENTS OF THE INVENTION

The invention accordingly provides a biaxially oriented polyester film where
 a) at least one of the two film surfaces bears an adhesion-promoting layer which has been applied in the form of an aqueous dispersion in-line to the film,
 b) the surface tension of the coated surface is smaller than 40 mN/m and greater than 20 mN/m,
 c) the coating is suitable for printing inks, in particular for Indigo printing inks, the result being good adhesion of the inks and a print image free from streaks/defects,
 d) the thickness of the coating is less than or equal to 1000 nm and greater than or equal to 5 nm.

The basis film is either a single- or multilayer film, and multilayer structures are preferred here.

At least 80% by weight of the film, preferably at least 85% by weight, and particularly preferably at least 90% by weight, is comprised of a polyester. The polyesters used are known. Those suitable for this purpose are, inter alia, polyesters comprised of ethylene glycol and terephthalic acid (=polyethylene terephthalate, PET), from ethylene glycol and naphthalene-2,6-dicarboxylic acid (=polyethylene 2,6-naphthalate PEN), from 1,4-bishydroxymethylcyclohexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters comprised of at least 90 mol %, in particular at least 95 mol %, of ethylene glycol units and terephthalic acid units or of ethylene glycol units and naphthalene-2,6-dicarboxylic acid units. The remaining monomer units are derived from other aliphatic, cycloaliphatic, or aromatic diols and/or other dicarboxylic acids. The base layer is preferably comprised of PET. Examples of other suitable aliphatic diols are diethylene glycol, triethylene glycol, aliphatic glycols of the formula HO—$(CH_2)_n$—OH, where n is an integer from 3 to 6 (in particular propane-1,3-diol, butane-1,4-diol, pentane-1,5-diol, and hexane-1,6-diol), or branched aliphatic glycols having up to 6 carbon atoms. Among the cycloaliphatic diols, mention should be made of cyclohexanediols (in particular cyclohexane-1,4-diol). Examples of other suitable aromatic diols are those of the formula HO—$C_6H_4$—X—$C_6H_4$—OH where X is —$CH_2$—, —$C(CH_3)_2$—, —$C(CF_3)_2$—, —O—, —S— or —$SO_2$—. Other suitable bisphenols are those of the formula HO—$C_6H_4$—$C_6H_4$—OH.

Preferred other aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid), or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, particularly suitable compounds are the ($C_3$—$C_{19}$)alkanediacids, where the alkane moiety may be straight-chain or branched.

By way of example, the polyesters may be prepared by the known transesterification process. The starting materials for this are dicarboxylic esters and diols, which are reacted using the customary transesterification catalysts, such as the salts of zinc, of calcium, of lithium, of magnesium, and of manganese. The intermediates are then polycondensed in the presence of widely used polycondensation catalysts, such as antimony trioxide or titanium salts, the use of titanium-containing catalysts being preferred. The preparation may be carried out just as successfully by the direct esterification process in the presence of polycondensation catalysts. This process starts directly from the dicarboxylic acids and the diols.

The film of the invention can moreover comprise inorganic or organic particles needed to adjust surface topography. The amount used of the particles depends on the substances used and on their particle size. The latter is generally in the range from 0.01 to 30.0 µm, preferably from 0.1 to 5.0 µm, and in particular from 0.3 to 3.5 µm.

Examples of suitable compounds for achieving roughness are calcium carbonate, apatite, silicon dioxide, titanium dioxide, aluminum oxide, crosslinked polystyrene, crosslinked PMMA, zeolites, and other silicates, and aluminum silicates. The amounts generally used of these compounds are from 0.05 to 30% by weight, preferably from 0.1 to 1% by weight (based on the weight of the layer in which they are present). If the intention is to produce white films or films with high haze, up to 30% by weight of filler is needed (e.g. barium sulfate or titanium dioxide) (based on the weight of the layer in which it is present).

The thickness of the inventive film is from 1 to 500 µm. The thickness is preferably from 6 to 300 µm, and particularly preferably from 12 to 250 µm.

The base film is either a single-layer film or preferably a multilayer film. The multilayer films are comprised of a base layer B, of at least one outer layer A or C, and, if appropriate, of other intermediate layers, and preference is particularly given here to a three-layer structure A-B-C.

For the outer layer(s), the raw materials described above for the base layer can be used. The thickness of the outer layer(s) is selected independently of the other layers and is preferably in the range from 0.1 to 10 µm, in particular from 0.2 to 5 µm, preferably from 1 to 3 µm, and the outer layers applied here to the two sides can have identical or different thickness and constitution. The thickness of the base layer is correspondingly given by the difference between total thickness of the film and the thickness of the outer and intermediate layer(s) applied, and can therefore vary by analogy with the total thickness within wide limits.

In one preferred embodiment, the base film is white, i.e. it comprises at least one whitening pigment at a concentration of from 5 to 20% by weight, preferably from 6 to 15% by weight. The white pigment is preferably either titanium dioxide or barium sulfate. The concentration here is selected according to the invention in such a way that the (Berger) whiteness of the film is greater than 70%, preferably greater than 80%, and particularly preferably greater than 85%.

In another preferred embodiment, the gloss of the coated side of the inventive film (measured to DIN 67530) at 20° is greater than 70, preferably greater than 100, and particularly preferably greater than 150. In this case, the print becomes high-gloss and achieves particularly high quality. These gloss values depend on the roughness of the film to which the coating is applied. Its $R_a$ should advantageously be smaller than 70 nm, preferably smaller than 50 nm, and particularly preferably smaller than 40 nm. Roughness $R_a$ should be at least 2 nm for acceptable winding behavior.

In another preferred embodiment, the gloss of the coated side at 20° is smaller than 40, preferably smaller than 30, and particularly preferably smaller than 20. In this case, the print becomes matt. These gloss values in turn depend on the roughness of the film to which the coating is applied. $R_a$ should advantageously be greater than 100 nm, preferably greater than 150 nm, and particularly preferably greater than 200 nm.

A very important factor for a good print image on printers in the HP Indigo range is that the coating is free from streaks and, respectively, defects. A visual assessment is needed for this purpose, since this is the best method of obtaining conclusions relevant to the final application. To this end, an HP Indigo printer is used with ElectroInk mark 3.2 black printing ink to print a length of 1 m and a width of 30 cm of the coated film. Three of these strips are produced and are observed at a distance of from 0.6 to 1 m at angles of 25 and 75° with respect to the surface. The radiation source used is a commercially available 60 watt incandescent bulb, its distance from the film being 1.5 m. The film is streak-free if fewer than 2, preferably none, of the film strips tested have discernible streak-like irregularities whose width is more than 0.5 mm. The film is defect-free if fewer than 2, preferably none, of the film strips have discernible irregularities whose size is more than 0.5×0.5 mm.

The surface tension of that side of the film coated with the printing ink-adhesion promoter is greater than 20 mN/m and smaller than 40 mN/m, preferably greater than 24 mN/m and smaller than 36 mN/m, particularly preferably greater than 28 mN/m and smaller than 32 mN/m.

The coating is applied in-line, i.e. during the film production process, advantageously prior to transverse stretching. Particular preference is given to application by means of the reverse gravure-roll coating process, as described by way of example in EP-A-0 769 540, permitting extremely homogeneous application of the coating. Application via the Meyer rod process is likewise suitable and can achieve relatively high coating thicknesses. The coating is preferably applied in the form of aqueous dispersion.

The layer thicknesses of the dried coatings are then from 5 to 1000 nm, preferably from 10 to 500 nm, particularly preferably from 20 to <500 nm, very particularly preferably from 20 to <200 nm, in particular from 20 to 100 nm.

The aqueous coating dispersion comprises at least 1% by weight of EAA (ethylene-acrylic acid copolymer) particles and not more than 20% by weight of EAA particles. At least 3 and not more than 15% by weight of EAA particles is preferred, and at least 6 and not more than 11% by weight of EAA particles is particularly preferred.

It has proven advantageous for the $d_{0.5}$ value (median of particle distribution by volume) of the particles used in the dispersions here to be from 1 to 200 μm, preferably from 40 to 150 μm, and particularly preferably from 60 to 80 μm.

It has moreover proven advantageous for the maximum of the particle distribution by volume of the EAA particles to be at a particle size of from 30 to 200 μm and/or particularly preferably from 40 to 90 μm (see test methods).

The pH of the dispersion is preferably from 7 to 10, particularly preferably from 8.5 to 9.5.

The dynamic viscosity (Höppler method, DIN 53015) of the dispersion is preferably from 1 to 4 mPa·s and particularly preferably from 1.5 to 2.5 mPa·s. If the viscosity of the dispersion is greater than 6.5 mPa·s it becomes unsuitable for in-line coating.

The preferred counterions with respect to the EAA are ammonium, potassium, and sodium ions. Sodium is particularly preferred.

The dispersion can comprise other components, such as waxes, inorganic particles, and surfactants, the proportion of these components, based on solids content here, preferably being smaller than that of the EAA particles.

By way of example, suitable dispersions can be purchased from MICHELMAN, INC., 9080 Shell Road, Cincinnati, Ohio 45236-1299, USA. By way of example, DP-4430 dispersion is suitable. However, contrary to the Michelman instructions, this dispersion has to be diluted to an extent of at least 50% with dist. water in order to be suitable for the in-line coating process.

Production Process

The present invention also provides a process for production of the inventive films. It encompasses
provision of a single-layer polyester film, or
provision of a multilayer film comprised of a base layer (B) and outer layer(s) A (and C), produced via coextrusion and shaping of the melts to give flat melt films,
coating of the film with an aqueous coating composition which comprises from 1 to 20% by weight, based on the total weight of the composition, of EAA (ethylene-acrylic acid copolymer) particles whose median particle size ($d_{50}$ value) is from 1 to 200 μm, the coating preferably being applied between the first and the second stretching step, and
biaxial stretching of the film, and heat-setting of the stretched film.

First, the polymer or the polymer mixture of the individual layers is compressed and plastified in an extruder. The melts are simultaneously pressed through a flat-film die, and the extruded multilayer film is drawn off on one or more take-off rolls, whereupon it cools and solidifies.

Biaxial orientation is usually carried out sequentially. For this, it is preferable to orient first longitudinally (i.e. in machine direction=MD) and then transversely (i.e. perpendicularly to machine direction=TD). Longitudinal orientation can be carried out with the aid of two rolls running at different speeds corresponding to the desired stretching ratio. For transverse orientation, use is generally made of an appropriate tenter frame.

Orientation can also be carried out simultaneously, the coating then being applied upstream of the frame, i.e. prior to longitudinal and transverse stretching. The application thicknesses selected then have to be appropriately higher in order to achieve the inventive dry-layer thicknesses. It has proven advantageous here for the area stretching ratio (longitudinal times transverse) to be smaller than 25 and preferably smaller than 18. The area stretching ratio should be greater than 9, however.

The temperature at which PET can usually be biaxially oriented can vary within a relatively wide range and depends on the desired properties of the film. Longitudinal stretching is generally carried out at from about 80 to 140° C. and transverse stretching at from about 80 to 150° C. The longitudinal stretching ratio $\lambda_{MD}$ here is in the range from 2.0:1 to 5:1. The transverse stretching ratio $\lambda_{TD}$ is generally in the range from 2.5:1 to 5.0:1. According to the invention, prior to transverse stretching one or both surfaces of the film are in-line coated by the known processes.

In the heat-setting which follows, the film is kept for from about 0.1 to 10 s at a temperature of from about 150 to 250° C. The film is then wound up conventionally.

It has proven advantageous here for the maximum heat-setting temperature to be at least 210° C., indeed preferably at least 220° C., and indeed particularly preferably at least 230° C. If the coated film reaches this temperature range, there is a marked reduction in reverse-side transfer of the coating. If the temperatures set are lower, the result can be offset of portions of the coating onto the uncoated reverse side. The easiest way of determining whether the film has achieved this temperature range is to determine the presence of a second endothermic peak above 200° C. below the melting peak by means of DSC (digital scanning calometry). EP-A-0 620 245 describes this method. It has proven advantageous for this peak to occur at a temperature greater than 205° C., preferably greater than 215° C., and particularly preferably greater than 225° C.

It has moreover proven advantageous for the transverse shrinkage of the film at 150° C. and 15 min to be smaller than 1.5%, preferably smaller than 1%, and particularly preferably smaller than 0.8%. The longitudinal shrinkage (machine direction) should advantageously be <2%, preferably <1.6%, and particularly preferably <1.3%. It is advantageous for there to be no film direction in which the shrinkage at 150° C. and 15 min is greater than −0.6% (elongation), and it is even more advantageous for the shrinkage to be greater than −0.3%. In order to achieve these shrinkage values, relaxation of at least 1% should be established in the heat-setting process. The shrinkage characteristic guarantees that the print image is retained even after storage or heating, and is not blurred.

The inventive film coated on one or both sides exhibits a defect-free print image after printing and very good processing behavior (i.e. no transport problems in printers, no discernible abrasion of printing inks, no break-offs). It features an excellent print image when inks for the HP Indigo printer range are used in the digital printing process. The inventive coated films are suitable as packaging material for foods and other consumable items, e.g. for individualized promotional prints in the packaging sector, for labels, and for cards, e.g. bank or ID cards with security features.

Because the film is very easy to handle and has very good processing properties, it is particularly suitable for processing in digital printers, such as the HP Indigo ws4000/ws4050 press and HP Indigo s2000 press from HP, Maastricht, NL. The printed inventive films have a very attractive, promotionally effective appearance.

It has been ensured that regrind arising by way of example as cut material during film production can be reintroduced into the extrusion process during production of the film at a concentration of from about 20 to 60% by weight, based on the total weight of the film, without a significant resultant adverse effect here on the physical properties of the film. In particular, there was very little rise in yellowness index (see test methods).

The following test methods were utilized to characterize the polymers and the films:
DIN=Deutsches Institut für Normung [German Institute for Standardization]
ASTM=American Society for Testing and Materials Yellowness Index The Yellowness Index of the film is determined to ASTM D 1925-70 by means of a Lambda 12 spectrophotometer from Perkin Elmer (USA), standard D65 illuminant, 10° standard observer. The Yellowness Index YI is calculated by the equation $$YI = [100 \times (1.28 \times X - 1.06 \times Z)]/Y$$

from the standard color values X, Y and Z measured.

Determination of Regrind Performance 100 kg of coated film of thickness 50 μm are granulated, dried for 2 hours at 145° C., and melted in a twin-screw extruder, and extruded at 285° C. through a pelletizing die. The extrudate is pelletized and the pellets are used to produce, as described below, another 50 μm film. The yellowness index of the coated film is compared with the yellowness index of the film produced from the regrind. If the rise is less than 50%, the regrind performance is good.

Dynamic Viscosity by Höppler Method (Falling-ball Viscosimeter)

The dynamic viscosity of the coating dispersions is determined by analogy with the DIN standard 53015 "Measurement of viscosity by means of the falling-ball viscosimeter, Höppler method". Prior to the test, the temperature of the coating dispersions is controlled to 20° C.

$d_{0.5}$ Particle Size Distribution

The particle size distribution is determined on the coating dispersions using a Mastersizer from Malvern Instruments Ltd., UK, (Malvern Mastersizer 2000 Version 5.10 G). The measurement range is set at from 0.02 to 2000 μm. The proportion in % by volume is plotted against the particle size in μm. The $d_{0.5}$ value gives the median of the particle distribution by volume (evaluated by means of Malvern Mastersizer 2000 Version 5.10 G software). The maximum of the particle distribution by volume of the EAA particles is represented by the largest local maximum in the above-mentioned plot of proportion in percent by volume against particle size at a particle size from 30 to 200 μm.

Gloss

Gloss was determined to DIN 67 530. Reflectance was measured, this being an optical parameter for the surface of a film. Using a method based on the standards ASTM D523-78 and ISO 2813, the incident angle was set at 20°. A light beam impacts the flat test surface at the set angle of incidence and is reflected or scattered by the surface. Light impacting the photoelectronic detector is indicated in the form of a proportional electrical variable. The measured value is dimensionless.

Surface Tension

Surface tension (surface free energy) was calculated from the contact angles by means of the Owens-Wendt-Rabel-Kaelble method. Water, 1,5-pentanediol, and diiodomethane are used as test liquids. A DSA-100 tester from Krüss GmbH, DE was used to determine the contact angles. The DSA software (2005 issue) associated with the equipment was used for evaluation by the Owens-Wendt-Rabel-Kaelble method. Gebhardt values were adopted for the polar and disperse component for 1,5-pentanediol, and Ström values were adopted for water and diiodomethane.

|  | IFT in mN/m | Disperse in mN/m | Polar in mN/m |
| --- | --- | --- | --- |
| Water | 72.8 | 21.8 | 51 |
| 1,5-Pentanediol | 43.3 | 27.6 | 15.7 |
| Diiodomethane | 50.8 | 50.8 | 0 |

Whiteness

Whiteness is determined by the Berger method, generally by mutually superposing more than 20 layers of film. Whiteness is determined with the aid of the ELREPHO electrical reflectance photometer from Zeiss, Oberkochen, Germany, standard illuminant C, 2° standard observer. Whiteness W is defined as $$W = RY + 3RZ - 3RX$$

where RX, RY and RZ are corresponding reflectance factors using an X, Y or Z color measurement filter. The white standard used comprises a barium sulfate pressing (see in this connection DIN 5033, part 9). An example of a detailed description is found in Hansl Loos, Farbmessung [Color measurement], Verlag Beruf und Schule, Itzehoe (1989).

Ink Adhesion

Ink adhesion was determined after printing with Indigo inks. For this, the biaxially oriented polyester films are coated with the primary color inks of the Indigo print system (Electroink cyan, magenta, yellow and black on HP Indigo press WS4050). After in each case 15 minutes, one hour, and one day of drying at room temperature, a commercially available crystal-clear Tesa adhesive film strip (type 57330, width 19 mm, roll length 33 m) from Tesa AG, DE is stuck (length 10 cm) to the printed side and the system is subjected to ten to-and-fro movements of a roll of weight 1 kg. After peeling of the adhesive tape from the coated and printed film, adhesion of the parent inks to the film is determined. A visual assessment is used.

| | |
| --- | --- |
| + | very good adhesion of all of the primary color inks of the Indigo print system to the biaxially oriented polyester film; after only 15 minutes, no ink could be discerned on the peeled Tesa film strip. |
| − | poor adhesion. Most of the ink is released after 15 minutes. After one hour, most or all of the ink remains on the polyester. |
| −− | very poor adhesion. After 15 minutes and one hour, most of the ink is in each case released. |

Coating Quality

Coating quality is assessed visually. To this end, an HP Indigo printer is used with ElectroInk mark 3.2 black printing ink to print a length of 1 m and a width of 30 cm of the coated film. Three of these strips are produced and are observed at a distance of from 0.6 to 1 m at angles of 25 and 75° with respect to the surface. The radiation source used is a commercially available 60 watt incandescent bulb, its distance from the film being 1.5 m. The number of film strips having streak-like irregularities whose width is more than 0.5 mm is evaluated. To assess freedom from defects, the number of strips with irregularities whose size is more than 0.5×0.5 mm is counted.

Streaks and irregularities are evaluated separately.

| | |
|---|---|
| + | good quality: no discernible streaks or irregularities |
| 0 | acceptable quality: discernible irregularities or streaks on one film strip |
| − | poor quality: discernible irregularities or streaks on more than one film strip. |

Roughness

Roughness $R_a$ of the film was determined to DIN 4768 with a cut-off of 0.25 mm.

Shrinkage

Thermal shrinkage was determined on square film samples with edge length 10 cm. The specimens are measured precisely (edge length $L_0$) and are heat-conditioned for 15 min at 150° C. in a drying cabinet with air circulation. The specimens are removed and measured precisely (edge length L) at room temperature. The shrinkage is calculated from the equation Shrinkage [%]=100*($L_0$−L)/L Film Production The chips were mixed according to the stated mixing ratios. The chips for the base layer B were dried for 3 h at 120° C. in a tower dryer. The chips were melted in the respective extruder for the appropriate layer (outer layers A and C twin-screw extruder; base B single-screw extruder) and coextruded via a flat-film die. The film was then stretched longitudinally by a factor of 3.8 at 122° C. in the machine direction. The longitudinally stretched film was corona-treated (8 kW/m) and then coated with the respective coating dispersion on the C layer via reverse gravure coating.

The film was then transversely stretched by a factor of 3.5 at 110° C. and heat-set at 235° C. for 2 s and transversely relaxed by 3% at 200° C. The length of the frame was 15 m and the speed of the machine was 150 m/min.

EXAMPLE 1

Film production as described above. Final film thickness 250 μm. Thickness of base layer 200 μm, thickness of each of outer layers A and C 25 μm.
  Base layer (B):
    86% by weight of polyethylene terephthalate whose SV value is 800
    14% by weight of Masterbatch from Sukano (Schindellegi, CH) with 50% by weight of titanium dioxide (median particle diameter of titanium dioxide about 0.3 μm), remainder being polyethylene terephthalate
  Outer layer (A) was a mixture comprised of:
    70% by weight of polyethylene terephthalate whose SV value is 800
    14% by weight of Masterbatch from Sukano (Schindellegi, CH) with 50% by weight of titanium dioxide (median particle diameter of titanium dioxide about 0.3 μm), remainder being polyethylene terephthalate
    16% by weight of Masterbatch comprised of 99% by weight of polyethylene terephthalate (SV value 800) and 1% by weight of SYLOBLOC® 44 H (synthetic $SiO_2$ from Grace, diameter=2.5 μm)
  Outer layer (C) was a mixture comprised of:
    94% by weight of polyethylene terephthalate whose SV value is 800
    6% by weight of Masterbatch from Sukano (Schindellegi, CH) with 50% by weight of titanium dioxide (median particle diameter of titanium dioxide about 0.3 μm), remainder being polyethylene terephthalate
  Coating dispersion:
    4 parts by volume of DIGIPRIME® DP4430 coating dispersion from Michelman Inc., USA are mixed with 6 parts of distilled water. pH of the coating dispersion=8.8. $d_{0.5}$=1.4 μm. Maximum of particle distribution of the EAA particles by volume=51 μm. Viscosity of dispersion=1.8 mPa·s.

The dry weight of the coating was 0.035 g/m², the dry coating thickness being 0.03 μm.

Shrinkage at 150° C. and 15 min was 0.9% in machine direction and 0.1% transversely. Whiteness was 85% on the coated side. Ink adhesion (ink stability) was very good. Assessment with respect to streaks and coating irregularities was good (+).

The surface tension of the coated side was 31 mN/m.

EXAMPLE 2

Film production as described above. Final film thickness 25 μm. Thickness of base layer 19 μm, thickness of each of outer layers A and C 3 μm.
  Base layer (B):
    100% by weight of polyethylene terephthalate whose SV value is 800
  Outer layer (A) was a mixture comprised of:
    95% by weight of polyethylene terephthalate whose SV value is 800
    5% by weight of Masterbatch comprised of 99% by weight of polyethylene terephthalate (SV value 800) and 1% by weight of SYLOBLOC® 44 H (synthetic $SiO_2$ from Grace, diameter=2.5 μm)
  Outer layer (C) was a mixture comprised of:
    20% by weight of polyethylene terephthalate whose SV value is 800
    80% by weight of Masterbatch comprised of 98% by weight of polyethylene terephthalate (SV value 800) and 2% by weight of SYLYSIA® 430 (synthetic $SiO_2$ from Fuji)
  Coating dispersion:
    4 parts by volume of DIGIPRIME® DP4430 coating dispersion from Michelman Inc., USA are mixed with 6 parts of distilled water. pH of the coating dispersion=8.8. $d_{0.5}$=1.4 μm. Maximum of particle distribution of the EAA particles by volume=51 μm. Viscosity of dispersion=1.8 mPa·s.

The dry weight of the coating was 0.035 g/m², the dry coating thickness being 0.03 μm.

Shrinkage at 150° C. and 15 min was 1.2% in machine direction and 0.5% transversely. Gloss (20°) was 19 on the coated side. The $R_a$ value was 250 nm. Ink adhesion was very good. Assessment with respect to streaks and coating irregularities was good (+).

The surface tension of the coated side was 32 mN/m. Regrind performance was good.

EXAMPLE 3

Film production as described above. Final film thickness 15 μm. Thickness of base layer 11 μm, thickness of each of outer layers A and C 2μm.
  Base layer (B):
    100% by weight of polyethylene terephthalate whose SV value is 800

Outer layer (A) was a mixture comprised of:
95% by weight of polyethylene terephthalate whose SV value is 800
5% by weight of Masterbatch comprised of 99% by weight of polyethylene terephthalate (SV value 800) and 1% by weight of SYLOBLOC® 44 H (synthetic $SiO_2$ from Grace, diameter=2.5 µm)

Outer layer (C) was a mixture comprised of:
95% by weight of polyethylene terephthalate whose SV value is 800
5% by weight of Masterbatch comprised of 99% by weight of polyethylene terephthalate (SV value 800) and 1% by weight of SYLOBLOC® 44 H (synthetic $SiO_2$ from Grace, diameter=2.5 µm)

Coating dispersion:
4 parts by volume of DIGIPRIME® DP4430 coating dispersion from Michelman Inc., USA are mixed with 6 parts of distilled water. pH of the coating dispersion=8.8. $d_{0.5}$=1.4 µm. Maximum of particle distribution of the EAA particles by volume=51 µm. Viscosity of dispersion=1.8 mPa·s.

The dry weight of the coating was 0.035 g/m$^2$, the dry coating thickness being 0.03 µm.

Shrinkage at 150° C. and 15 min was 1.5% in machine direction and 0.9% transversely. Gloss (20°) was 159 on the coated side. The $R_a$ value was 25 nm. Ink adhesion was very good. Assessment with respect to streaks and coating irregularities was good (+).

The surface tension of the coated side was 30 mN/m.
Regrind performance was good.

COMPARATIVE EXAMPLE 1

Film as in Example 3, but no coating.
Shrinkage at 150° C. and 15 min was 1.5% in machine direction and 0.9% transversely. Gloss (20°) was 170 on the coated side. The $R_a$ value was 23 nm. Ink adhesion was very poor (--). Assessment with respect to streaks and coating irregularities was poor (-).

COMPARATIVE EXAMPLE 2

Film as in Example 3, but different coating.
Coating dispersion:
8 parts by volume of DIGIPRIME®) DP4430 coating dispersion from Michelman Inc., USA are mixed with 2 parts of distilled water. pH of the coating dispersion=8.4. $d_{0.5}$=1.4 µm. Maximum of particle distribution of the EAA particles by volume=51 µm. Viscosity of dispersion=12 mPa·s.

Shrinkage at 150° C. and 15 min was 1.5% in machine direction and 0.9% transversely. Gloss (20°) was 140 on the coated side. The $R_a$ value was 31 nm. Ink adhesion was very poor (-). Assessment with respect to streaks and coating irregularities was poor (-).

COMPARATIVE EXAMPLE 3

Film as in Example 3, but different coating=DIGIPRIME®) DP4430 coating dispersion from Michelman Inc., USA.

Coating with acceptable quality was impossible. Immediately after the applicator, the coating exhibited irregularity and break-up, and after orientation it had visibly discernible irregularity on the film surface. An increased number of film break-offs occurred during transverse stretching.

The invention claimed is:

1. An in-line coated, biaxially oriented polyester film, comprising at least one coated surface having a coating comprised of the dried residue of an aqueous coating composition disposed thereon, wherein (i) the aqueous coating composition comprises EAA (ethylene-acrylic acid copolymer) particles; (ii) the thickness of the dried residue ranges from 5 to 100 nm; (iii) the counterions for the EAA have been selected from ammonium, potassium, and sodium ions and (iv) the surface tension of the coated surface is smaller than 40 mN/m.

2. The polyester film as claimed in claim 1, wherein said film is white, the (Berger) whiteness of the film being greater than 70%.

3. The polyester film as claimed in claim 1, wherein the gloss of the coated side (measured to DIN 67530) at 20° is greater than 70.

4. The polyester film as claimed in claim 3, wherein the $R_a$ value of the coated surface is smaller the 70 nm.

5. The polyester film as claimed in claim 1, wherein the gloss of the coated side (measured to DIN 67530) at 20° is smaller than 40.

6. The polyester film as claimed in claim 5, wherein the $R_a$ value of the coated surface is greater than 100 nm.

7. A process for printing comprising printing polyester film as claimed in claim 1 on digital printing machines.

8. Digital printing media comprising polyester film as claimed in claim 1.

9. A process for production of a biaxially oriented polyester film as claimed in claim 1, comprising the following steps:
   (i) providing a single- or multilayer polyester film which has been produced via extrusion or coextrusion,
   (ii) coating the film with an aqueous coating composition which comprises from 1 to 20% by weight, based on the weight of the composition, of EAA particles whose median particle size ($d_{50}$ value) is from 1 to 200 µm and whose counterions for the EAA have been selected from ammonium, potassium, and sodium ions, and
   (ii) biaxially stretching the film and heat-setting the stretched film.

10. The process as claimed in claim 9, wherein the biaxially stretching comprises first and second stretching steps and the aqueous coating composition is applied between the first and the second stretching steps.

11. The process as claimed in claim 9, wherein the maximum of the size distribution of the EAA particles is from 30 to 200 µm.

12. The process as claimed in claim 9, wherein the pH of the aqueous coating composition is from 7 to 10.

13. The process as claimed in claim 9, wherein the dynamic viscosity (Höppler method, DIN 53015) of the aqueous coating composition is from 1 to 4 mPa·s.

14. The process as claimed in claim 9, wherein the aqueous coating composition comprises one or more additional components selected from the group consisting of waxes, inorganic particles, and surfactants.

15. The process as claimed in claim 14, wherein the proportion of the additional components, based on the solids content of the coating composition, is smaller than that of the EAA particles.

* * * * *